United States Patent
Jain et al.

(10) Patent No.: US 11,853,688 B2
(45) Date of Patent: Dec. 26, 2023

(54) AUTOMATIC DETECTION AND REMOVAL OF TYPESETTING ERRORS IN ELECTRONIC DOCUMENTS

(71) Applicant: Adobe Inc., San Jose, CA (US)

(72) Inventors: Ashish Jain, Delhi (IN); Arushi Jain, Delhi (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 17/687,106

(22) Filed: Mar. 4, 2022

(65) Prior Publication Data

US 2023/0281379 A1  Sep. 7, 2023

(51) Int. Cl.
*G06F 40/166* (2020.01)
*G06F 40/109* (2020.01)
(Continued)

(52) U.S. Cl.
CPC .......... *G06F 40/166* (2020.01); *G06F 40/106* (2020.01); *G06F 40/109* (2020.01); *G06F 40/232* (2020.01); *G06F 40/103* (2020.01)

(58) Field of Classification Search
CPC ..... G06F 40/166; G06F 40/109; G06F 40/232
See application file for complete search history.

(56) References Cited

U.S. PATENT DOCUMENTS 3,219,806 A * 11/1965 O'Brien ................ B41B 27/00
  234/6
4,679,153 A * 7/1987 Robinson ............... G06K 15/00
  345/468

(Continued)

FOREIGN PATENT DOCUMENTS

CN  110188326 A * 8/2019 .......... G06F 17/212
JP  2001290803 A * 10/2001
(Continued)

OTHER PUBLICATIONS

Nukefactory, "How to fix Widows, Orphans, and Runts in Adobe InDesign automatically with Styles and GREP", Aug. 20, 2021, Length 5:06, https://www.youtube.com/watch?v=uiD5qQVxsRo, See also, 13 pages: https://nukefactory.com/tutorials/widows-orphans-and-runts/ (Year: 2021).*

Edgee, "Five Techniques for fixing Widows and Orphans using InDesign & Illustrator.", Mar. 3, 2018, 6 pages, https://www.edgee.net/five-techniques-for-fixing-widows-and-orphans-using-indesign-illustrator/ (Year: 2014).*

(Continued)

*Primary Examiner* — Benjamin Smith
(74) *Attorney, Agent, or Firm* — NICHOLSON DE VOS WEBSTER & ELLIOT LLP

(57) ABSTRACT

Embodiments are disclosed for eliminating typographical errors from an electronic document. The method may include obtaining an electronic document comprising a plurality of text paragraphs. The method may further include detecting a plurality of typographical errors in the plurality of text paragraphs. The method may further include indexing a set of error paragraphs, wherein each paragraph in the set of error paragraphs includes at least one typographical error. The method may further include determining a priority for each typographical error based on a magnitude of the typographical error. The method may further include adjusting one or more attributes of each paragraph in the set of error paragraphs based on the priority for each typographical error.

20 Claims, 10 Drawing Sheets

(51) Int. Cl.
  *G06F 40/232* (2020.01)
  *G06F 40/106* (2020.01)
  *G06F 40/103* (2020.01)

(56) References Cited

U.S. PATENT DOCUMENTS

| | | | | |
|---|---|---|---|---|
| 4,833,627 | A * | 5/1989 | Leszczynski | B41B 23/00 715/255 |
| 5,459,827 | A * | 10/1995 | Allouche | G06F 40/103 715/204 |
| 5,835,920 | A * | 11/1998 | Horton | G06F 40/114 715/210 |
| 5,953,735 | A * | 9/1999 | Forcier | G06F 40/10 715/863 |
| 6,434,581 | B1 * | 8/2002 | Forcier | G06F 3/0488 715/273 |
| 6,442,578 | B1 * | 8/2002 | Forcier | G06F 40/10 715/863 |
| 6,948,119 | B1 * | 9/2005 | Farmer | G06F 40/103 715/255 |
| 6,975,425 | B1 * | 12/2005 | Abe | G06T 11/60 358/1.9 |
| 7,024,022 | B2 * | 4/2006 | Harrington | G06V 30/414 382/286 |
| 7,035,439 | B2 * | 4/2006 | Harrington | G06V 10/993 382/286 |
| 7,191,390 | B2 * | 3/2007 | Williamson | G06F 40/106 715/251 |
| 7,191,396 | B2 * | 3/2007 | Williamson | G06F 40/103 715/251 |
| 7,246,311 | B2 * | 7/2007 | Bargeron | G06F 40/103 715/251 |
| 7,301,672 | B2 * | 11/2007 | Abe | G06T 11/60 358/1.9 |
| 7,444,586 | B1 * | 10/2008 | Wormley | G06F 40/163 715/256 |
| 7,786,995 | B2 * | 8/2010 | Abe | G06T 11/203 345/468 |
| 7,835,902 | B2 * | 11/2010 | Gamon | G06F 40/30 704/7 |
| 8,042,038 | B1 * | 10/2011 | Wormley | G06F 40/103 715/256 |
| 8,214,736 | B2 * | 7/2012 | Greenfield | G06F 40/114 715/251 |
| 8,306,356 | B1 * | 11/2012 | Bever | G06V 30/268 382/292 |
| 8,755,629 | B2 * | 6/2014 | Bever | G06V 30/268 382/292 |
| 8,908,999 | B2 * | 12/2014 | Ishihara | G06V 10/987 382/181 |
| 9,600,447 | B2 * | 3/2017 | Wabyick | G06F 40/10 |
| 10,242,277 | B1 * | 3/2019 | Manohar | G06K 9/6201 |
| 10,318,614 | B2 * | 6/2019 | Kidambi | G06F 16/258 |
| 10,621,428 | B1 * | 4/2020 | Cai | G06V 30/414 |
| 11,429,785 | B2 * | 8/2022 | Kwon | G06F 40/166 |
| 11,481,572 | B2 * | 10/2022 | Huang | G06V 30/19147 |
| 2003/0055851 | A1 * | 3/2003 | Williamson | G06F 40/103 715/251 |
| 2003/0167448 | A1 * | 9/2003 | Williamson | G06F 40/103 715/251 |
| 2003/0192011 | A1 * | 10/2003 | Williamson | G06F 40/106 715/251 |
| 2005/0028098 | A1 * | 2/2005 | Harrington | G06F 40/226 715/244 |
| 2005/0028099 | A1 * | 2/2005 | Harrington | G06V 30/414 715/244 |
| 2005/0055635 | A1 * | 3/2005 | Bargeron | G06F 40/103 715/251 |
| 2005/0102628 | A1 * | 5/2005 | Salesin | G06T 1/20 715/764 |
| 2005/0105799 | A1 * | 5/2005 | Strohecker | G06F 3/04883 382/186 |
| 2005/0168778 | A1 * | 8/2005 | Abe | G06T 11/60 358/1.18 |
| 2006/0100852 | A1 * | 5/2006 | Gamon | G06F 40/211 704/9 |
| 2006/0236230 | A1 * | 10/2006 | Lin | G06F 40/103 715/244 |
| 2007/0079236 | A1 * | 4/2007 | Schrier | G06F 40/114 715/209 |
| 2007/0133842 | A1 * | 6/2007 | Harrington | G06V 10/993 382/112 |
| 2007/0176804 | A1 * | 8/2007 | Abe | G06T 11/203 341/84 |
| 2009/0327875 | A1 * | 12/2009 | Kinkoh | G06F 40/186 715/255 |
| 2010/0042916 | A1 * | 2/2010 | Greenfield | G06F 40/103 715/251 |
| 2013/0047078 | A1 * | 2/2013 | Bever | G06V 30/268 715/245 |
| 2013/0243263 | A1 * | 9/2013 | Ishihara | G06V 30/40 382/112 |
| 2014/0250371 | A1 * | 9/2014 | Wabyick | G06F 40/10 715/243 |
| 2017/0031868 | A1 * | 2/2017 | Elings | G06F 40/103 |
| 2017/0364485 | A1 * | 12/2017 | Kidambi. | G06F 40/117 |
| 2018/0018305 | A1 * | 1/2018 | Hassan | G06F 40/189 |
| 2018/0140250 | A1 * | 5/2018 | Sweetman | A61B 5/742 |
| 2021/0124869 | A1 * | 4/2021 | Agarwal | G06F 40/109 |
| 2022/0164530 | A1 * | 5/2022 | Kwon | G06F 40/279 |

FOREIGN PATENT DOCUMENTS

JP 2001290805 A * 10/2001
JP 2001290806 A * 10/2001

OTHER PUBLICATIONS

Just Your Type by Mick, "Widows and orphans and runts—oh my!", Oct. 29, 2018, 9 pages, https://mcwriting.com/2018/10/29/widows-and-orphans-and-runts/ (Year: 2018).*

Jim Felici, "How to Solve Typographic Widows and Orphans", 11 pages, Jan. 18, 2010, https://creativepro.com/how-solve-typographic-widows-and-orphans/ (Year: 2010).*

Ted Page accessible digital documents (add), , "Fixing justified text in InDesign", Oct. 6, 2017, 8 pages, https://accessible-digital-documents.com/blog/dyslexia-justified-text-indesign/ (Year: 2017).*

\* cited by examiner

AUTOMATIC DETECTION AND REMOVAL OF TYPESETTING ERRORS IN ELECTRONIC DOCUMENTS

BACKGROUND

In electronic documents, typographical errors are some of the most common errors that degrade document readability, however, removing typographical errors are also some of the most labor-intensive tasks for editing electronic documents. The many options for modifying a typeface and typesetting to correct each individual error presents further challenges as some corrective actions create additional typographical errors. Further, the many modification options along with the large volume of different typefaces present a challenge to accurately correct multiple typographical errors within an electronic document. These aspects degrade presentation quality of the electronic document and readability.

SUMMARY

Introduced here are techniques/technologies that relate to removing typographical errors from electronic documents. The typography management system receives or accesses electronic documents that may include typographical errors. The typography management system detects and classifies multiple types of typographical errors that degrade the appearance of the electronic document. Once the typographical errors are detected and classified, the typography management system removes the typographical errors by adjusting parameters of the paragraph to adjust the lines of the paragraph such as adding or removing a line to correct the typographical error.

The typography management system provides an extensible solution that accommodates different languages, combinations of fonts within a document, or other embedded content such as images, graphics, or other types of content. By employing the typography management system, electronic documents can be processed in a scalable way that can be implemented for any type of document with any combination of text, images, or other content. The typography management system can provide a selectable removal of one or more types of typographical errors. The typography management system can also automatically remove all typographical errors.

Additional features and advantages of exemplary embodiments of the present disclosure will be set forth in the description which follows, and in part will be obvious from the description, or may be learned by the practice of such exemplary embodiments.

BRIEF DESCRIPTION OF THE DRAWINGS

The detailed description is described with reference to the accompanying drawings in which:

FIG. 3 illustrates an example of typographical error detection in accordance with one or more embodiments;

FIG. 6 illustrates an example of a user interface for automated removal of typographical errors in accordance with one or more embodiments;

DETAILED DESCRIPTION

Figure 1:
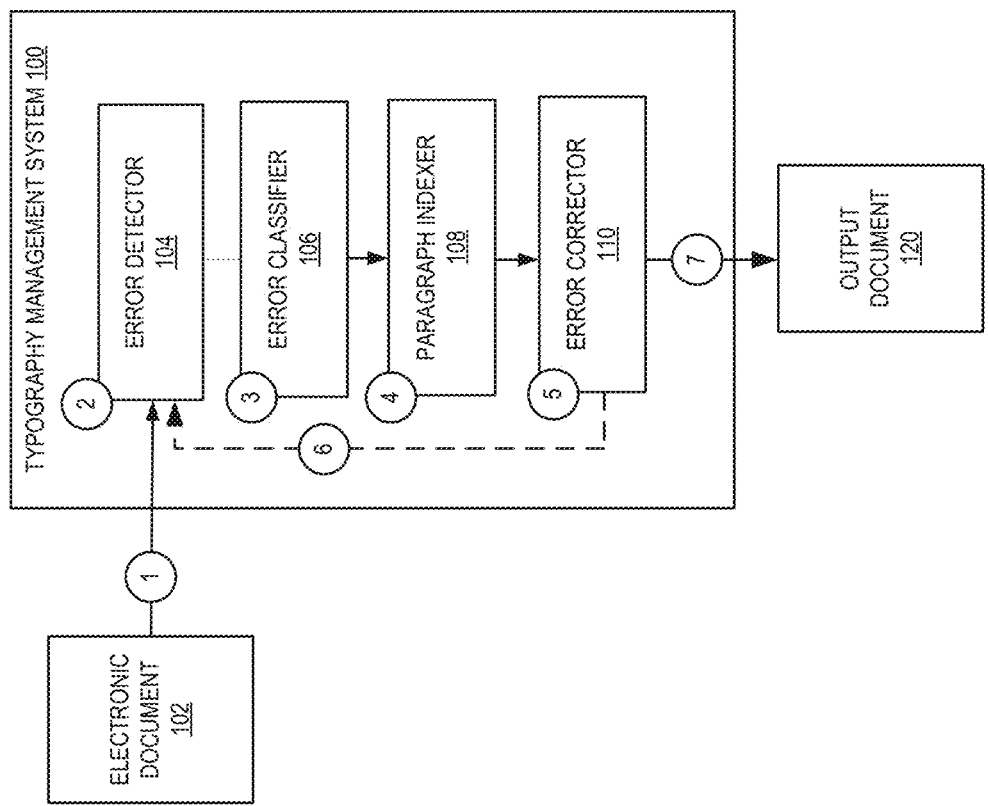
FIG. 1 illustrates a diagram of a process of typographical error detection and correction in accordance with one or more embodiments.

One or more embodiments of the present disclosure includes a typography management system that corrects errors that are in an electronic document. In the field of typography, avoiding typographical errors that degrade the appearance of a document presents challenges for scalability, and flexibility across the wide range of typefaces, embedded content, and other aspects of electronic documents. There are several types of typographical errors that create a visual interruption in the flow that breaks a reader's focus. Some of the errors include a last line of a paragraph that is too short and leaves a disruptive amount of unused space, a first line of a paragraph that precedes a page or formatting break, or a last line of a paragraph that occurs immediately after a page or formatting break. These typographical errors can be challenging to remove as adjusting a single paragraph in a document to remove one error may create more errors in other paragraphs. Thus, a comprehensive approach at the document level is described that classifies a type of error, assigns a priority to the paragraph, and then removes each typographical error while detecting or preventing additional typographical errors from being created in the process.

As discussed, conventional techniques lack the ability to efficiently adjust multiple parameters of the typeface and typesetting across different fonts and document formatting areas. As a result, conventional systems require individually manipulating parameters. This creates an inconsistent and laborious process that is not scalable across typefaces or fonts. In one approach, a soft return is used to modify appearance of the paragraph. The soft return is a carriage return that is inserted to perform a word wrap or line break. However, the soft return creates a deviation in the formatting of the paragraph by disrupting two lines of the paragraph which degrades the visual appearance. Other conventional techniques include individually manipulating one or more parameters of each paragraph where an error is detecting, however, given the wide array of parameters, adjusting each paragraph by individual parameter creates a significant delay and each individual parameter adjustment may create additional errors.

To address these and other deficiencies in conventional systems, embodiments perform detection, classification, and removal of typographic errors in electronic documents by adjusting one or more parameters of the typeface to remove the typographic errors. This creates a scalable system for removing typographic errors from electronic documents that are used with various languages, typefaces, fonts, and provides a solution that adapts to embedded non-text content. Although embodiments are generally described with respect to text paragraphs in documents, embodiments may be used with mixed media including text, embedded images, or other content.

Embodiments simultaneously optimize and remove typographical errors from an electronic document. Automatic detection and removal of typographical errors improves visual appearance of the electronic document and is scalable to large documents to efficiently process corrective actions. Typically, a user would have to manually adjust typesetting attributes for each paragraph. However, these adjustments can create additional errors in subsequent paragraphs and can be extremely challenging for long documents or documents with embedded content which may be moved by any combination of manual adjustments. This makes identifying the correct adjustments difficult for the average user. These adjustments also generally require expertise of a user that an average user does not possess and thus the adjustments are not widely accessible. Additionally, aspects of the disclosure find optimal values that minimize the differences between the uncorrected and corrected versions of the document, whereas conventional techniques leave users to guess at what values may work without dramatically changing the layout of their documents.

FIG. 1 illustrates a diagram of a process of typographical error detection and correction in accordance with one or more embodiments. As depicted in FIG. 1, a typography management system 100 receives an electronic document 102 at numeral 1. The electronic document 102 includes multiple typographical errors. For example, as used herein, the term "electronic document" refers to any digital text file including one or more paragraphs or collections of text. For example, the term "electronic document" includes digital files with the following, or other, file extensions: .DOC, .DOCX, .PDF, .TXT, .HTML, .RTF, or .ODT. The term "electronic document" also includes digital files that have a combination of text and other embedded content (e.g., embedded images, tables, etc.). Accordingly, although much of the description herein is phrased in terms of text paragraphs, it will be appreciated that the disclosure applies to editing other objects that are in-line, wrapped, otherwise embedded into the electronic file.

As used herein, "typographical error" refers to aspects of the electronic document 102 which degrades presentation quality of the electronic document and readability. For example, as used herein, the term "typographical error" includes features that degrade the visual presentation of the electronic document such as, but not limited to a single word as a last line of a paragraph or a single line of text at the beginning or end of a column or page. A single word, group of words, or a set of characters ("a runt") at the end of a paragraph creates a visual interruption in the flow that breaks a focus of a reader. For example, a runt causes the break in the focus because of unnecessary white space following the runt. Similarly, a single line or word of text that jumps to the next page/column or starts a page/column causes a similar break in the focus of the reader. In some cases, these typographical errors are called "orphans" when a paragraph-beginning single line or word of text appears by itself at the bottom of a page or column, thus separated from the rest of the text. In other cases, these typographical errors are called "widows" when a paragraph-ending single line or word of text appears by itself at the beginning of a page or column, thus separated from the rest of the text.

In some embodiments, a user provides an electronic document from a document store (e.g., on their device, such as a file system or application, etc., or from a storage service, such as a remote file system, cloud-based storage service, etc.) or captured by a camera (e.g., an image to text software application). The electronic document 102 may include multiple text paragraphs, pages, images, tables, or other content. For example, the electronic document may include text paragraphs that includes one or more typographical errors. Once the electronic document 102 is obtained by the typography management system 100, the typography management system processes the electronic document using error detector 104 to determine a number of typographical errors contained in the electronic document 102.

At numeral 2, the error detector 104 parses the text or other content of electronic document 102. The error detector 104 determines a number of paragraphs of the electronic document 102. The error detector 104 analyzes each paragraph of the electronic document and identify one or more errors in each paragraph. The error detector generates a total number of typographical errors contained in the electronic document 102. The error detector 104 creates a set of error paragraphs that indicate document locations of paragraphs (each being an "error paragraph") that contain the typographical error. For example, the error detector 104 detects a plurality of locations such as page breaks, column breaks, section breaks, indentations, or formatting changes in the electronic document 102. The error detector 104 detects paragraph opening lines, paragraph ending lines based on proximity of the paragraph opening lines or paragraph ending lines to a detected formatting break and determines a number of characters in a line.

Figure 2:
FIG. 2 illustrates an example of typographical errors in accordance with one or more embodiments.

At numeral 3, an error classifier 106 identifies a type of each typographical error contained in the electronic document 102. The error classifier 106 classifies the typographical errors detected at numeral 2 as a runt, orphan, or widow. Turning briefly to FIG. 2, FIG. 2 illustrates an example of typographical errors in accordance with one or more embodiments. For instance, a set of error paragraphs 200 is depicted. In this example, in a first paragraph, the error classifier determines that the first paragraph has a last line that has less than 10 characters. The error classifier 106 classifies the first paragraph as including a runt 202. Continuing with the present example, in a second paragraph, the error classifier 106 determines that the second paragraph has a last line that is preceded by a formatting break such as a column break, a frame break, a page break, or another break in formatting. The error classifier 106 classifies the second paragraph as including a widow 204. Continuing with the present example, in a third paragraph, the error classifier 106 determines that the third paragraph has a first line that is succeeded by a formatting break such as a column break, a frame break, a page break, or another break in formatting. The error classifier 106 classifies the third paragraph as including an orphan 206. In some embodiments, the error classifier 106 determines a type of each typographical error based on a set of predetermined rules. In other embodiments, the error classifier uses an adaptive or machine learning approach to determine the type of each typographical error based on a closest formatting break to the typographical error.

Returning to FIG. 1, in some embodiments, the typography management system 100 may aggregate (e.g., in a vector or structured data format) a total number of typographical errors, a quantity of each type of typographical errors with a set of associated locations. While not shown in FIG. 1, the typography management system 100 may store these values in a data storage medium that is part of typography management system 100 or remotely accessible to the typography management system 100. In some embodiments, the aggregation can be performed by the error detector 104 or another component of the typography management system 100.

Once the typographical errors detected at numeral 2 have been classified at numeral 3, a paragraph indexer 108 assigns a priority to each of the typographical errors. The paragraph indexer 108 analyzes each error paragraph to determine one or more corrective actions that are applied to the error paragraph. Additionally, in some embodiments, the paragraph indexer 108 assigns a priority to each error paragraph based on the number of characters required to eliminate the typographical error. Returning to the previous example of FIG. 2 above, with the first paragraph, second paragraph, and third paragraph, at numeral 4, the paragraph indexer 108 determines a number of changes (e.g., addition or subtractions) that are needed to eliminate each typographical error.

For instance, the error classifier 106 determined that the first paragraph included a typographical error of a runt 202. The paragraph indexer 108 determines a number of characters that must be removed from the runt (e.g., the number of characters being 10 or less) to remove the line that includes the runt. The runt 202 includes 5 characters. The paragraph indexer 108 then determines a number of characters that must be removed or added to the widow to remove the line that includes the widow. The paragraph indexer 108 determines that the widow 204 requires an adjustment of an additional 18 characters or a removal of 25 characters to remove the widow 204. The paragraph indexer 108 then determines a number of characters that must be removed or added to the orphan 206 to remove the line that includes the orphan. The paragraph indexer 108 determines that the orphan 206 requires an adjustment of an additional 10 characters to add a line that does not create a runt or a removal of 42 characters to remove the orphan 206.

As discussed, in some embodiments, the paragraph indexer 108 assigns a priority to each error paragraph based on the number of characters required to eliminate the typographical error. In this example, the paragraph indexer 108 assigns the priority of: first paragraph, second paragraph, and third paragraph. In some embodiments, the paragraph indexer 108 assigns the greatest priority to the text paragraph that has a least number of characters of the error. The paragraph indexer 108 analyzes additional attributes such as a margin.

At numeral 5, an error corrector 110 receives the electronic document, the error paragraphs, and/or the priority assignment for each error paragraph. The error corrector 110 performs an optimization of multiple paragraph attributes to determine a corrective action to apply to each error paragraph. In some embodiments, the error corrector 110 analyzes any number of candidate adjustments. For example, the candidate adjustments include an adjustment to letter spacing, word spacing, glyph scaling, a font size, a font, a typeface adjustment (e.g., bold, italics, condensed), or other features to remove the typographical error. In one example, the error corrector 110 adjusts the letter spacing, word spacing, and/or glyph scaling. The error corrector 110 performs an optimization such as a binary search to assign values that minimize the variation from the default values of the typeface while eliminating the typographical errors. For instance, the error corrector 110 may adjust any of the letter spacing, word spacing, glyph scaling individually, or in combination to reduce the values by 5%.

At numeral 6. the error corrector 110 generates an intermediate document that includes at least one adjustment. The error corrector 110 outputs the intermediate document to the error detector 104. The error detector 104 analyzes the intermediate document to detect any additional typographical errors created by the at least one adjustment. The typography management system 100 performs the processes described at numerals 2-6 iteratively until zero typographical errors are detected. The error corrector 110 is configured to adjust the parameters if additional errors are detected. For instance, if the error corrector 110 makes an initial adjustment of 5% to the one or more of the parameters as described above, a subsequent adjustment may be 7.5%, 10%, or other factors.

At numeral 7, the typography management system 100 generates an output document 120. For instance, the typography management system 100 incorporates an aggregated set of adjustments made by the error corrector 110 into an output document 120. The typography management system 100 determines, using the error detector 104, that the electronic document does not contain any additional typographical errors. The typography management system 100 provides the output document 120 to the user interface, another computing system, or store the output document 120.

Figure 3:
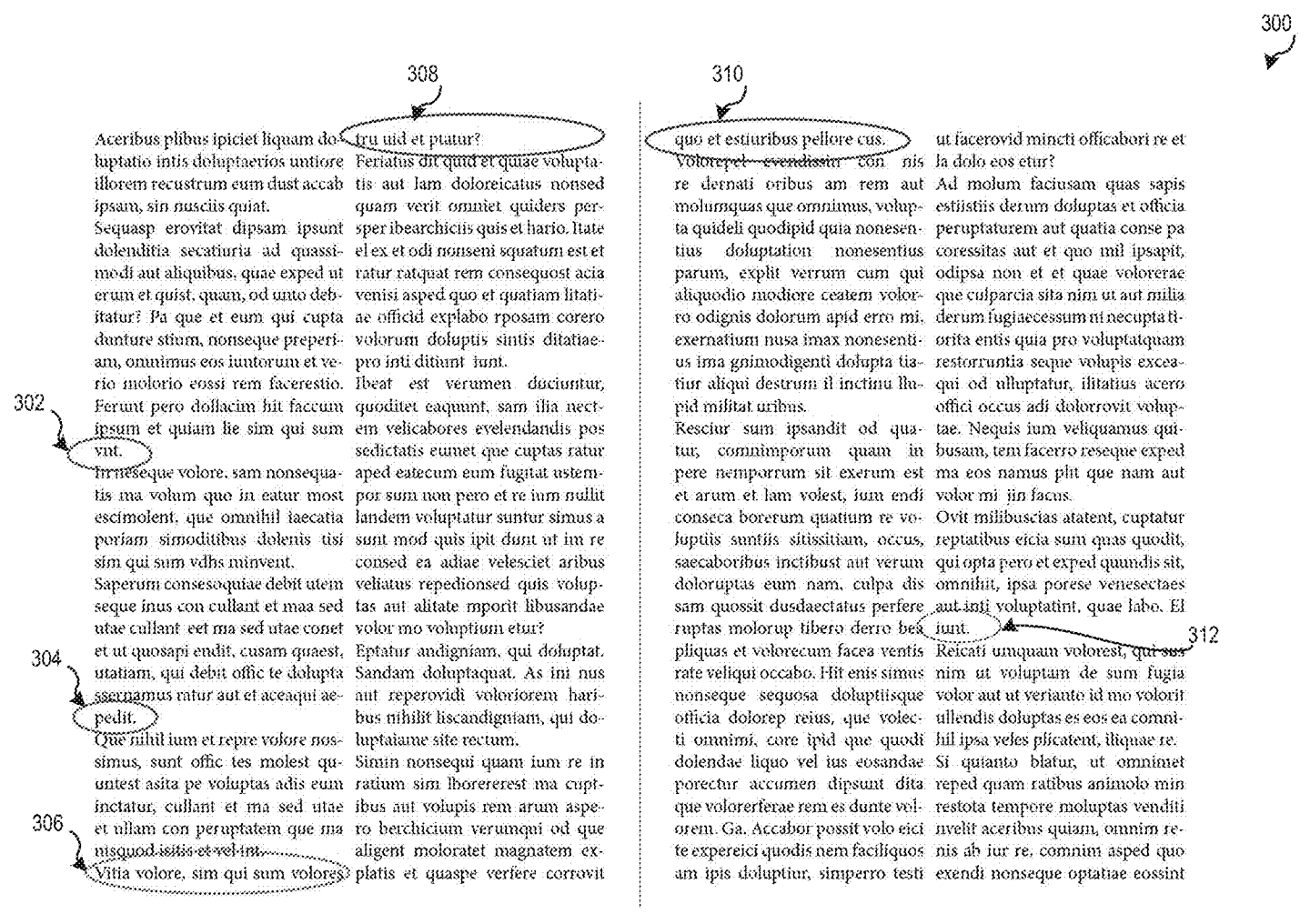

FIG. 3 illustrates an example of typographical error detection in accordance with one or more embodiments. As described above, the electronic document 102 is received by the error detector 104. The error detector 104 generates a text excerpt 300 that includes a set of error paragraphs from the electronic document where an error is detected. The error detector 104 detects typographical errors 302-312. The error classifier 106 determines the typographical errors to include a first runt 302, a second runt 304, a first orphan 306, a first widow 308, a second widow 310, and a third runt 312. The error detector 104 determines any number of typographical errors in the electronic document that includes any number of paragraphs, columns, and pages. In some embodiments, the error detector 104 parses metadata such as page breaks, column breaks, paragraph breaks such as indentation change, a carriage return or similar location indicator. The error detector 104 determines that text is present immediately following or immediately before the metadata location.

In some embodiments, the error detector 104 generates a vector representation of the set of error paragraphs. For instance, the error detector 104 generates a paragraph position, and a number of characters for each detected typographical error. As described above, the output of the error detector 104 is processed by the error classifier 106. The error classifier updates the vector representation of the set of error paragraphs by including an error type as a text value, a numeric indicator, or a similar feature.

Figure 4:
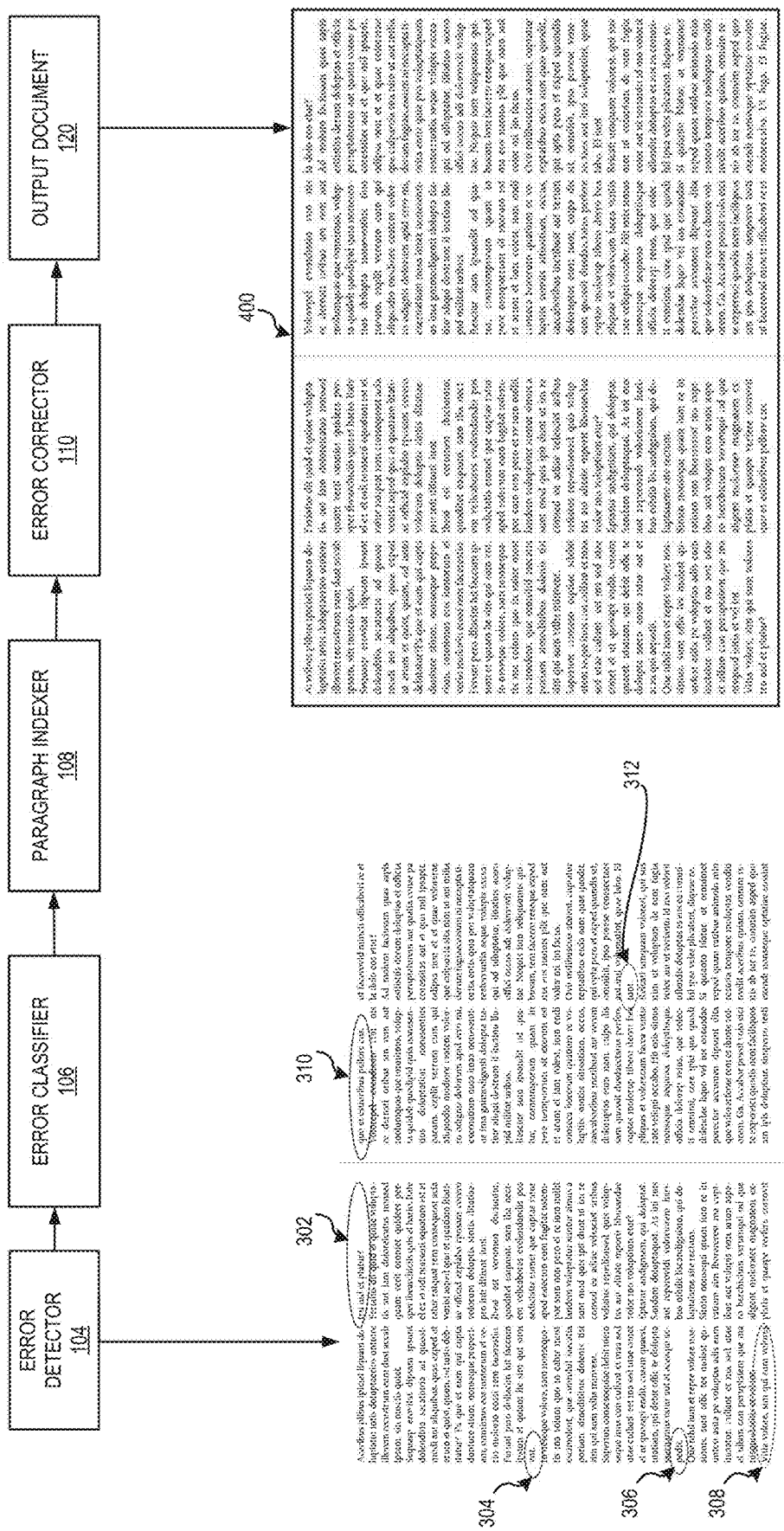
FIG. 4 illustrates an example of typographical error detection and correction in accordance with one or more embodiments.

FIG. 4 depicts an example of a process of detecting, classifying, and eliminating typographical errors of an electronic document. As described above, the error detector 104 receives an electronic document. The error detector 104 detects a presence and formatting of text or other content included in the electronic document. The error detector 104 detects a set of or more error paragraphs. In some embodiments, the error detector 104 annotates the electronic document (e.g., with metadata, tags, or other annotations) to indicate a location of each typographical error. The error classifier 106 determines a type of each typographical error identified by the error detector 104. The typography management system 100 may present an annotated electronic document that includes an indication of the location and type of typographical error to a user via a user interface. An example of the user interface is described at least with respect to FIG. 6. In the example depicted by FIG. 3, the error detector 104 detects typographical errors 302-312. The error classifier 106 determines the typographical errors to include a first runt 302, a second runt 304, a first orphan 306, a first widow 308, a second widow 310, and a third runt 312. The typography management system 100 represents the typographical errors, including a position and type for each typographical error, in the electronic document. The typography management system 100 may store these values in a data storage medium.

Figure 5:
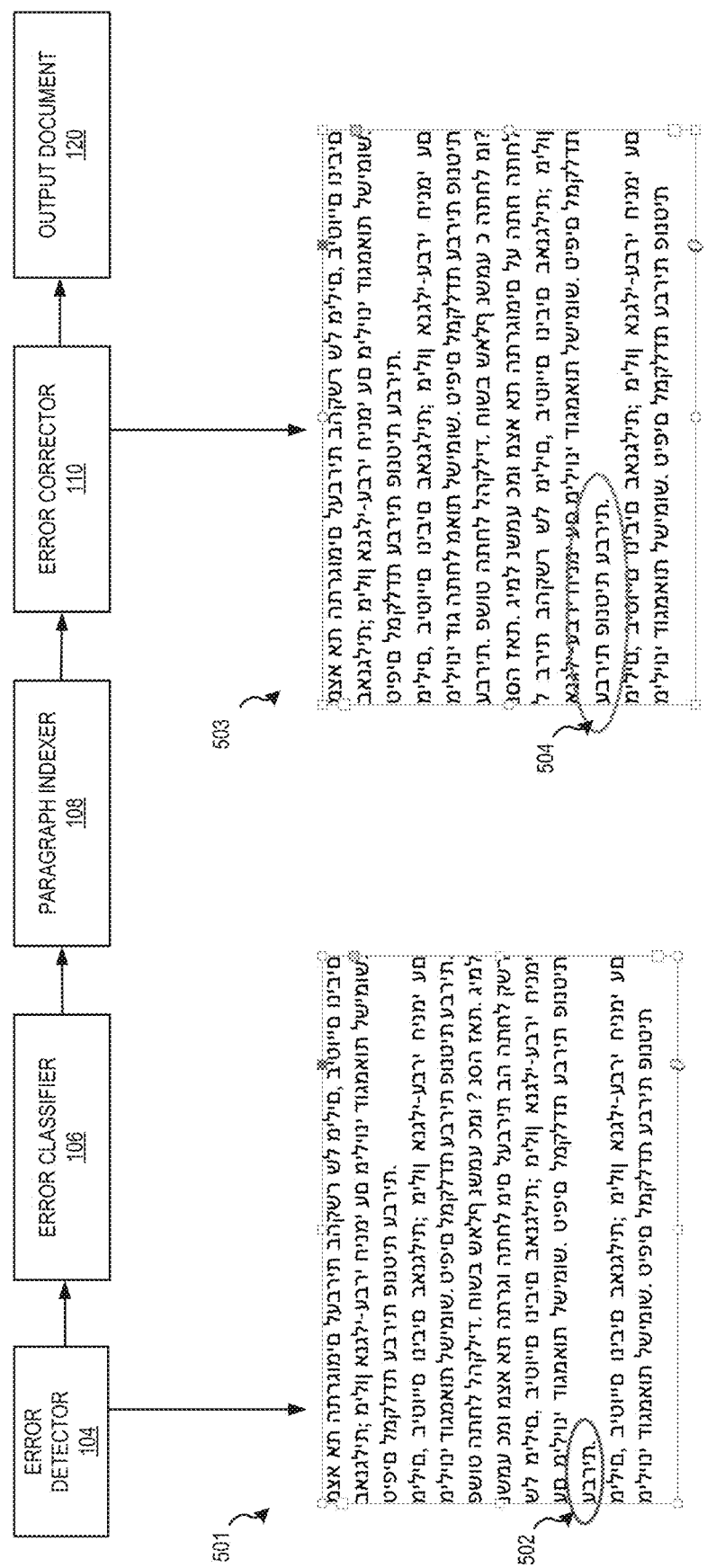
FIG. 5 illustrates an example of typographical error detection and correction with different typeface and language in accordance with one or more embodiments.

FIG. 5 illustrates an example of typographical error detection and correction with different typeface and language in accordance with one or more embodiments. As an additional example, a Hebrew text as illustrated in FIG. 5 uses significantly different characters and is read in the opposite direction as a Latin text as shown by FIG. 4. However, similar techniques as described with regard to FIG. 4 are applied to the Hebrew text in accordance with some embodiments. As described regarding FIG. 4, the set of error paragraphs 501 are processed similarly to that of FIG. 4. The error detector 104 detects a typographical error that is classified by the error classifier as a runt 502. The error corrector removes the runt 502 and generates a set of corrected paragraphs 503 including a corrected line 504. The typography management system includes the set of corrected paragraphs 503 and generates the output document 120. The typography management system can perform typographical error correction on different typefaces, such as different languages, which have different glyph spacing, sizing, or other parameters. Additionally, the typography management system corrects typographical errors when the electronic document contains mixed content such as multiple types of fonts, multiple languages, or other embedded content in the paragraph structure of the electronic document.

Figure 6:
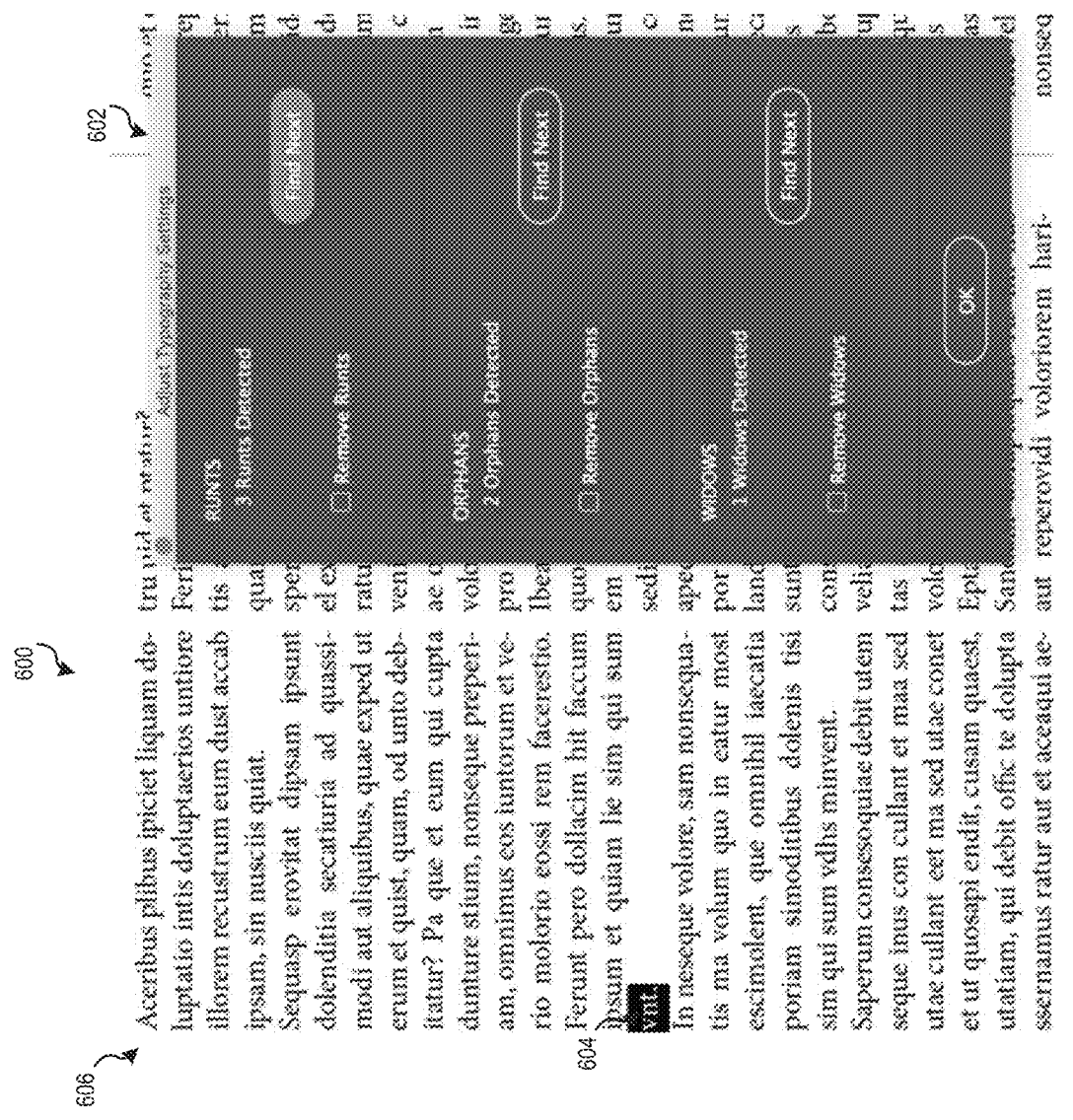

FIG. 6 illustrates an example of a text excerpt 600 for automated removal of typographical errors in accordance with one or more embodiments. As shown in FIG. 6, the text excerpt 600, which can be presented by a user interface, enables the user to view the electronic document or the annotated electronic document 606 that indicates the typographical errors, and a menu that provides an interactive menu 602 to receive a selection of which typographical errors the user selects for removal. This simplifies the removal of typographical errors that the user selects, allowing the user to quickly identify each type of typographical error, such as runt 604 and remove the errors automatically or selectively. While not shown in FIG. 6, the interactive menu 602 can provide an option for the user to remove all typographical errors simultaneously.

Figure 7:
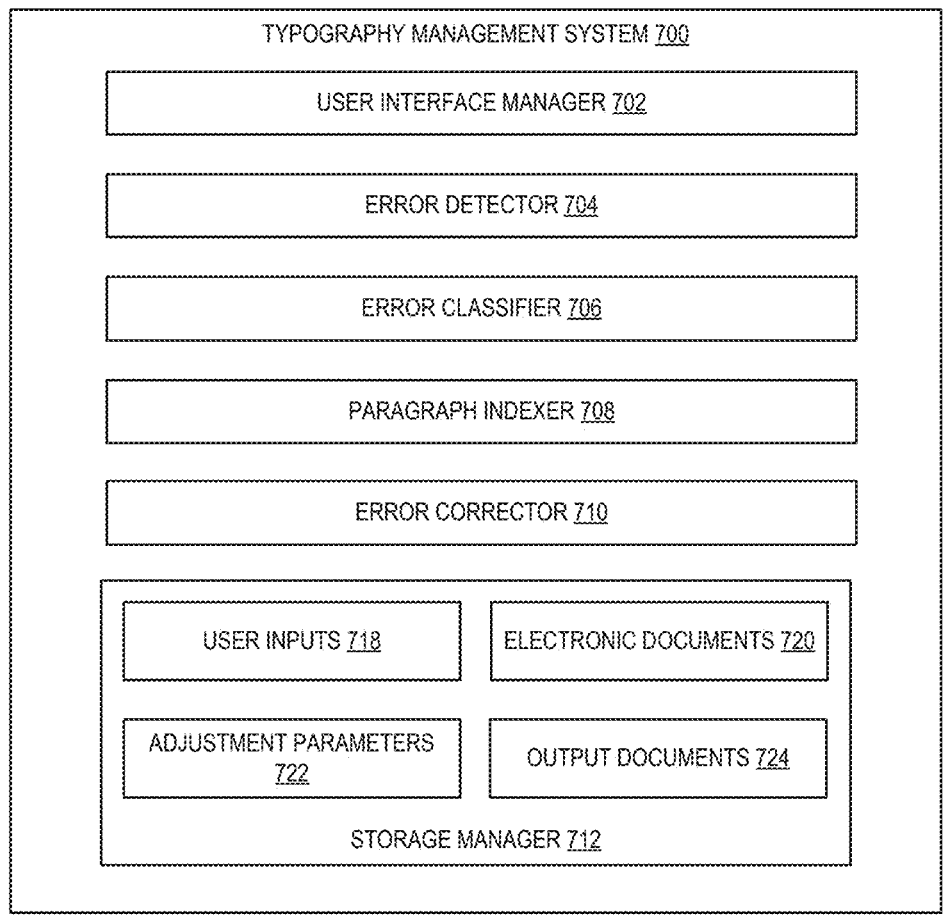
FIG. 7 illustrates a schematic diagram of typography management system in accordance with one or more embodiments.

FIG. 7 illustrates a schematic diagram of typography management system 700 in accordance with one or more embodiments. As shown, typography management system 700 may include, but is not limited to, a user interface manager 702, an error detector 704, error classifier 706, a paragraph indexer 708, an error corrector 710, and storage manager 712 that includes user inputs 718, electronic document 720, adjustment parameters 722, and output documents 724.

As illustrated in FIG. 7, the typography management system 700 includes a user interface manager 702. For example, the user interface manager 702 allows users to provide input electronic documents to the typography management system 700. In some embodiments, the user interface manager 702 provides a user interface through which the user uploads electronic documents, select correction options from an interactive menu. Alternatively, or additionally, the user interface may enable the user to select a remote file, either by providing an address (e.g., a URL or other endpoint) associated with the remote file or connecting to a remote storage (e.g., cloud storage) that includes the remote file. In some embodiments, the user interface manager 702 enables the user to select a specific portion of the electronic document for processing. For example, the user interface may allow the user to select one or more paragraphs of the electronic document to remove typographical errors.

The error detector 704 parses the text or other content of electronic document 720. The error detector 704 determines a number of paragraphs of the electronic document 720 and analyzes each paragraph of the electronic document 720 to identify one or more errors in each paragraph. The error detector 704 detects a plurality of paragraph locations, a plurality of page breaks, column breaks, section breaks, indentations, or formatting changes in the electronic document. The error detector 704 detects paragraph opening lines, paragraph ending lines, and determines a number of characters in a line. After detecting the paragraph locations, the error detector 704 identifies a proximity of the paragraph opening lines or paragraph ending lines to a detected formatting break. One or more of the paragraphs opening lines, paragraph ending lines, or number of characters in a paragraph ending line can be detected in a particular position relative to the detected formatting break and indicates that a typographical error is present.

The error classifier 706 generates a type of each typographical error contained in the electronic document 720. Some examples a type of error by determining that a last line that has less than 10 characters, a last line that is preceded by a formatting break, or a first line that is succeeded by a formatting break. The error classifier 706 classifies a runt by determining that a line preceding a paragraph break is less than a threshold number of characters. For example, this threshold may be set to 10 characters. Alternatively, the threshold may be specified by the user, the user's organization (e.g., a house style of a publisher or other entity), etc. A paragraph break is detectable as a line break, a carriage return, or a change in indentation. The error classifier 706 classifies a widow by determining that a line occurs after a page break or column break, and that the line is a paragraph ending line. A page break or a column break is detectable as a change in column position of the text or detecting metadata indicating a page break. The error classifier 706 classifies an orphan by determining that a line occurs before a page break or column break, and that the line is a paragraph opening line. A page break or a column break is determined as described above.

The paragraph indexer 708 may determine a number of changes (e.g., addition or subtractions) that are needed to eliminate the typographical error. The paragraph indexer 708 assigns a priority to each error paragraph based on the number of characters required to eliminate the typographical error. In some examples, the number of characters can be determined by the paragraph indexer or received from the error classifier 706. For instance, the paragraph indexer 708 forms a priority queue of paragraphs that each contain a detected error ("error paragraph") by sorting the error paragraphs based on a number of character changes that are needed in a paragraph in order to either add or subtract a line without a creation of an additional runt. In some embodiments, the paragraph indexer 708 assigns error paragraphs that have the fewest number of character changes the highest priority. The paragraph indexer 708 calculates a number of characters that is occupied by the last line of the paragraph and stores the number of characters in a first parameter that indicates a number of characters preceding a formatting break. The paragraph indexer 708 calculates the number of characters that is required to be added to the last line of the paragraph such that a new line is created with the new line having more than 10 characters (e.g., the new line does not create an additional runt). The paragraph indexer 708 store the number of characters in a second parameter that indicates a number of characters required to add to remove the typographical error. The paragraph indexer 708 compares the first parameter and the second parameter and determines whether the corrective action is adding or removing the line. The paragraph indexer 708 assigns a priority based on the number of characters and the corrective action.

The error corrector 710 performs an optimization of multiple paragraph attributes to determine a corrective action to apply to each error paragraph including adjusting letter spacing, word spacing, glyph scaling, a font size, a font, a typeface adjustment, or other features to remove the typographical error. In one example, the error corrector 710 searches the document to find a first typographical error that contains an orphan or widows. The error corrector 710 computes an optimum value for each typographic feature (letter spacing, word spacing, and glyph scaling), and performs a binary search to select values of minimal variation from the default values used in the typeface and calculate penalty for the variation from the default value. In some embodiments, multiple adjustments are possible, however, the error corrector 710 selects an adjustment that minimizes the deviation from the default values by determining a candidate adjustment from a plurality of candidate adjustments that removes the at least one typographical error based on the number of characters associated with the candidate adjustment (e.g., removing a line requires 25 characters, adding a line requires 20 characters, etc.). The error corrector 710 computes a difference between an updated electronic document in which each candidate adjustment is applied and the electronic document prior to the adjustment. The error corrector 710 selects the candidate adjustment by determining the minimum difference corresponding to each candidate adjustment of the plurality of candidate adjustments and the default values for the typeface.

As illustrated in FIG. 7, the typography management system 700 also includes the storage manager 712. The storage manager 712 maintains data for the typography management system 700. The storage manager 712 maintains data of any type, size, or kind as necessary to perform the functions of the typography management system 700.

The storage manager 712, as shown in FIG. 7, includes the user inputs 718. The user inputs 718 includes a selection of typographical errors, and the like, as discussed in additional detail above. In one or more embodiments, the user inputs 718 include user selections of typographical errors to remove.

As further illustrated in FIG. 7, the storage manager 712 also includes electronic document 720. The electronic document 720 can be a digital file that have a combination of text and other embedded content.

The storage manager 712 may also include adjustment parameters 722. The adjustment parameters 722 may include a set of typographic adjustments associated with the electronic document 720. The adjustment parameters 722 may be applied to the electronic document 720 to generate an output document 724. The storage manager 712 may also include the output document 724 that can be output from the typography management system 700.

Each of the components 702-710 of the typography management system 700 and their corresponding elements (as shown in FIG. 7) may be in communication with one another using any suitable communication technologies. It will be recognized that although components 702-710 and their corresponding elements are shown to be separate in FIG. 7, any of components 702-710 and their corresponding elements may be combined into fewer components, such as into a single facility or module, divided into more components, or configured into different components that may serve a particular embodiment.

The components 702-710 and their corresponding elements can comprise software, hardware, or both. For example, the components 702-710 and their corresponding elements comprise one or more instructions stored on a computer-readable storage medium and executable by processors of one or more computing devices. When executed by the one or more processors, the computer-executable instructions of the typography management system 700 cause a client device and/or a server device to perform the methods described herein. Alternatively, the components 702-710 and their corresponding elements can comprise hardware, such as a special purpose processing device to perform a certain function or group of functions. Additionally, the components 702-710 and their corresponding elements can comprise a combination of computer-executable instructions and hardware.

Furthermore, the components 702-710 of the typography management system 700 may, for example, be implemented as one or more stand-alone applications, as one or more modules of an application, as one or more plug-ins, as one or more library functions or functions that may be called by other applications, and/or as a cloud-computing model. Thus, the components 702-710 of the typography management system 700 may be implemented as a stand-alone application, such as a desktop or mobile application. Furthermore, the components 702-710 of the typography management system 700 may be implemented as one or more web-based applications hosted on a remote server. Alternatively, or additionally, the components of the typography management system 700 may be implemented in a suit of mobile device applications or "apps."

Figure 8:
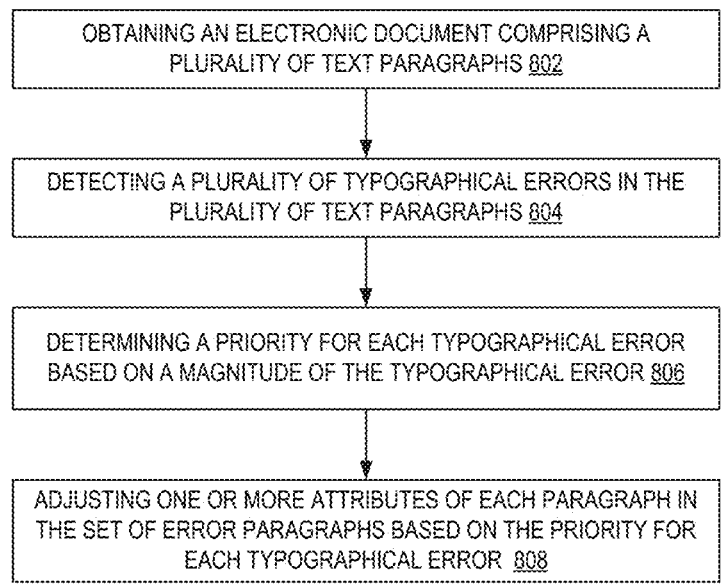
FIG. 8 illustrates a flowchart of a series of acts in a method of typographical error detection and correction in accordance with one or more embodiments.

FIGS. 1-7, the corresponding text, and the examples, provide a number of different systems and devices that detects, classifies, and eliminates typographical errors for electronic documents. In addition to the foregoing, embodiments also be described in terms of flowcharts comprising acts and steps in a method for accomplishing a particular result. For example, FIG. 8 illustrates a flowchart of an exemplary method in accordance with one or more embodiments. The method described in relation to FIG. 8 may be performed with fewer or more steps/acts or the steps/acts may be performed in differing orders. Additionally, the steps/acts described herein may be repeated or performed in parallel with one another or in parallel with different instances of the same or similar steps/acts.

FIG. 8 illustrates a flowchart 800 of a series of acts in a method of detecting, classifying, and removing one or more typographical errors in accordance with one or more embodiments. In one or more embodiments, the method 800 is performed in a digital medium environment that includes the typography management system 700. The method 800 is intended to be illustrative of one or more methods in accordance with the present disclosure and is not intended to limit potential embodiments. Alternative embodiments may include additional, fewer, or different steps than those articulated in FIG. 8.

As illustrated in FIG. 8, the method 800 includes an act 802 of obtaining an electronic document comprising a plurality of text paragraphs. The electronic document may include a plurality of text paragraphs that include at least one typographical error. The typography management system receives the electronic document from a user, another computing device, or a document management system.

In some embodiments, the method 800 includes an act 804 of detecting a plurality of typographical errors in the plurality of text paragraphs. The typography management system detects a plurality of typographical errors in the plurality of text paragraphs that degrade the appearance of the electronic document. The typography management system determines a number of paragraphs of the electronic document. The typography management system analyzes each paragraph of the electronic document and identify one or more errors in each paragraph. The typography management system generates a total number of typographical errors contained in the electronic document. The typography management system may create a set of error paragraphs that indicate document locations of paragraphs that contain the typographical error.

In some embodiments, the method 800 includes an act 806 of determining a priority for each typographical error based on a magnitude of the typographical error. The typography management system assigns a priority to each error paragraph based on the number of characters needed to eliminate the typographical error. In some embodiments, determining the priority further includes determining the magnitude of the typographical error based on a number of characters associated with each paragraph in text paragraph that removes the at least one typographical error included in the paragraph of the text paragraph and assigning the priority to each paragraph based on the number of characters.

In some embodiments, the method 800 includes an act of 808 adjusting one or more attributes of each text paragraph in the set of error paragraphs based on the priority for each typographical error. As described above, the typography management system performs an optimization of multiple paragraph attributes to determine a corrective action to apply to each error paragraph including adjusting letter spacing, word spacing, glyph scaling, a font size, a font, a typeface adjustment, or other features to remove the typographical error. In some embodiments, adjusting one or more attributes includes adjusting the character spacing, the word spacing, or the glyph scaling by a first amount, and responsive to the adjusting by the first amount, detecting a second plurality of typographical errors within the plurality of text paragraphs. The typography management system then adjusts the character spacing, the word spacing, or the glyph scaling by a second amount in response to detecting the second plurality of typographical errors.

In some embodiments, the method 800 may include indexing a set of text paragraphs with each paragraph includes at least one typographical error. The method 800 also may include determining a candidate adjustment from a plurality of candidate adjustments that removes the at least one typographical error based on the number of characters. The typography management system can then compute a difference between an updated electronic document in which the candidate adjustment is applied and the electronic document. By computing whether the updated electronic document improves the typographical appearance of the electronic document, the typography management selects the candidate adjustment based on the difference corresponding to each candidate adjustment of the plurality of candidate adjustments.

Figure 9:
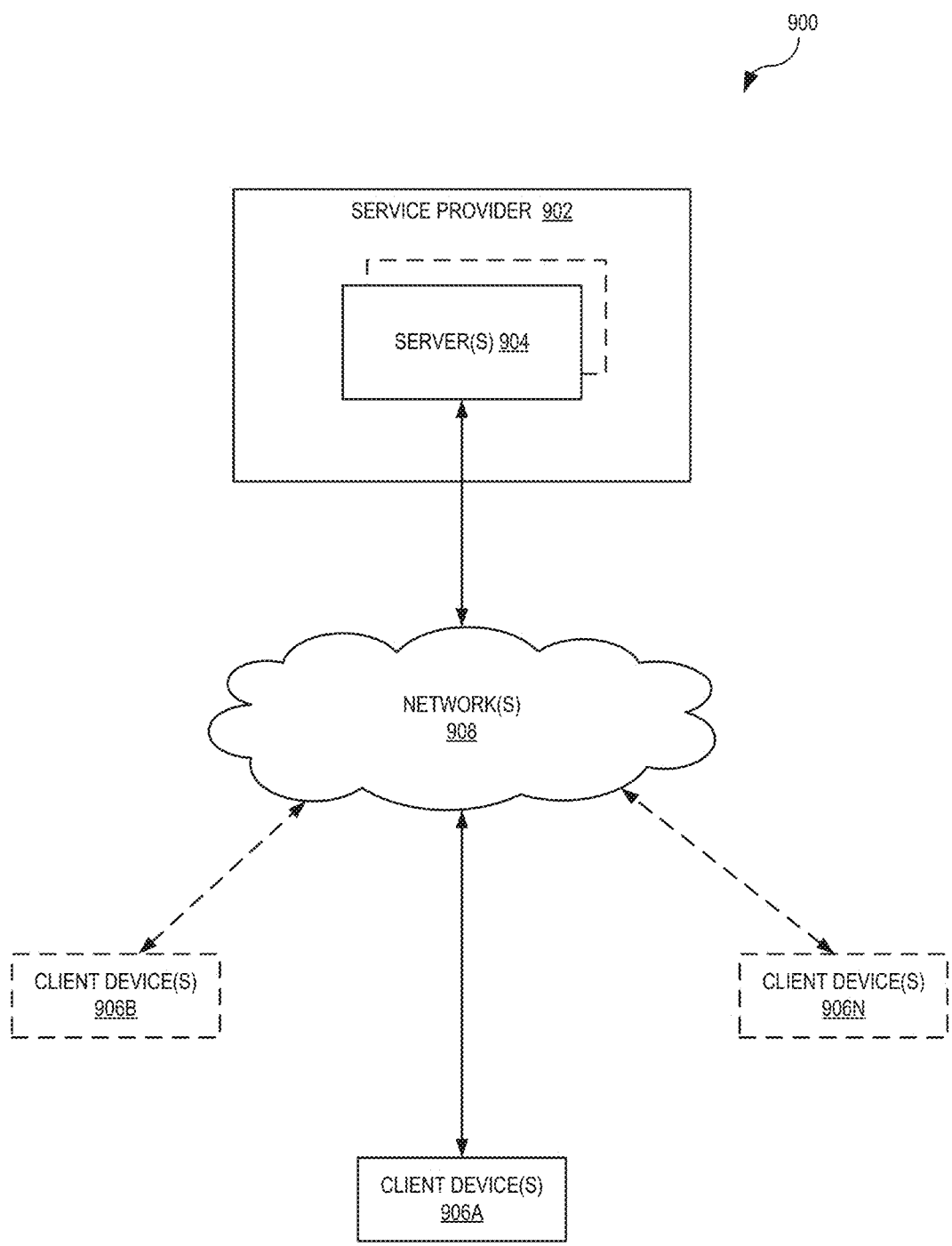
FIG. 9 illustrates a schematic diagram of an exemplary environment in which the typography management system can operate in accordance with one or more embodiments.

FIG. 9 illustrates a schematic diagram of an exemplary environment 900 in which the typography management system 700 operates in accordance with one or more embodiments. In one or more embodiments, the environment 900 includes a service provider 902 which may include one or more servers 904 connected to a plurality of client devices 906A-906N via one or more networks 908. The client devices 906A-906N, the one or more networks 908, the service provider 902, and the one or more servers 904 may communicate with each other or other components using any communication platforms and technologies suitable for transporting data and/or communication signals, including any known communication technologies, devices, media, and protocols supportive of remote data communications, examples of which will be described in more detail below with respect to FIG. 10.

Although FIG. 9 illustrates a particular arrangement of the client devices 906A-906N, the one or more networks 908, the service provider 902, and the one or more servers 904, various additional arrangements are possible. For example, the client devices 906A-906N may directly communicate with the one or more servers 904, bypassing the network 908. Or alternatively, the client devices 906A-906N may directly communicate with each other. The service provider 902 may be a public cloud service provider which owns and operates their own infrastructure in one or more data centers and provides this infrastructure to customers and end users on demand to host applications on the one or more servers 904. The servers may include one or more hardware servers (e.g., hosts), each with its own computing resources (e.g., processors, memory, disk space, networking bandwidth, etc.) which may be securely divided between multiple customers, each of which may host their own applications on the one or more servers 904. In some embodiments, the service provider may be a private cloud provider which maintains cloud infrastructure for a single organization. The one or more servers 904 may similarly include one or more hardware servers, each with its own computing resources, which are divided among applications hosted by the one or more servers for use by members of the organization or their customers.

Similarly, although the environment 900 of FIG. 9 is depicted as having various components, the environment 900 may have additional or alternative components. For example, the environment 900 can be implemented on a single computing device with the typography management system 700. In particular, the typography management system 700 may be implemented in whole or in part on the client device 902A.

As illustrated in FIG. 9, the environment 900 may include client devices 906A-906N. The client devices 906A-906N may comprise any computing device. For example, client devices 906A-906N may comprise one or more personal computers, laptop computers, mobile devices, mobile phones, tablets, special purpose computers, TVs, or other computing devices, including computing devices described below with regard to FIG. 12. Although three client devices are shown in FIG. 9, it will be appreciated that client devices 906A-906N may comprise any number of client devices (greater or smaller than shown).

Moreover, as illustrated in FIG. 9, the client devices 906A-906N and the one or more servers 904 may communicate via one or more networks 908. The one or more networks 908 may represent a single network or a collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. Thus, the one or more networks 908 may be any suitable network over which the client devices 906A-906N may access service provider 902 and server 904, or vice versa. The one or more networks 908 will be discussed in more detail below with regard to FIG. 12.

In addition, the environment 900 may also include one or more servers 904. The one or more servers 904 may generate, store, receive, and transmit any type of data, including user inputs 818, electronic documents 820, adjustment parameters 822, output documents 824, or other information. For example, a server 904 may receive data from a client device, such as the client device 906A, and send the data to another client device, such as the client device 902B and/or 902N. The server 904 also transmit electronic messages between one or more users of the environment 900. In one example embodiment, the server 904 is a data server. The server 904 also comprise a communication server or a web-hosting server. Additional details regarding the server 904 will be discussed below with respect to FIG. 11.

As mentioned, in one or more embodiments, the one or more servers 904 include or implement at least a portion of the typography management system 700. In particular, the typography management system 700 comprise an application running on the one or more servers 904 or a portion of the typography management system 700 can be downloaded from the one or more servers 904. For example, the typography management system 700 include a web hosting application that allows the client devices 906A-906N to interact with content hosted at the one or more servers 904. To illustrate, in one or more embodiments of the environment 900, one or more client devices 906A-906N access a webpage supported by the one or more servers 904. In particular, the client device 906A run a web application (e.g., a web browser) to allow a user to access, view, and/or interact with a webpage or website hosted at the one or more servers 904.

Upon the client device 906A accessing a webpage or other web application hosted at the one or more servers 904, in one or more embodiments, the one or more servers 904 provide access to one or more electronic documents 820 stored at the one or more servers 904. Moreover, the client device 906A receive a request (i.e., via user input) to remove typographical errors in the electronic documents 820 and provide the request to the one or more servers 904. Upon receiving the request, the one or more servers 904 automatically perform the methods and processes described above to remove typographical errors in the electronic documents. The one or more servers 904 provide all or portions of one or more output documents 824, to the client device 906A for display to the user.

As just described, the typography management system 700 may be implemented in whole, or in part, by the individual elements 902-908 of the environment 900. It will be appreciated that although certain components of the typography management system 700 are described in the previous examples with regard to particular elements of the environment 900, various alternative implementations are possible. For instance, in one or more embodiments, the typography management system 700 is implemented on any of the client devices 906A-N. Similarly, in one or more embodiments, the typography management system 700 may be implemented on the one or more servers 904. Moreover, different components and functions of the typography management system 700 may be implemented separately among client devices 906A-906N, the one or more servers 904, and the network 908.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure also be implemented in cloud computing environments. In this description, "cloud computing" is defined as a model for enabling on-demand network access to a shared pool of configurable computing resources. For example, cloud computing be employed in the marketplace to offer ubiquitous and convenient on-demand access to the shared pool of configurable computing resources. The shared pool of configurable computing resources be rapidly provisioned via virtualization and released with low management effort or service provider interaction, and then scaled accordingly.

A cloud-computing model is composed of various characteristics such as, for example, on-demand self-service, broad network access, resource pooling, rapid elasticity, measured service, and so forth. A cloud-computing model also exposes various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 10:
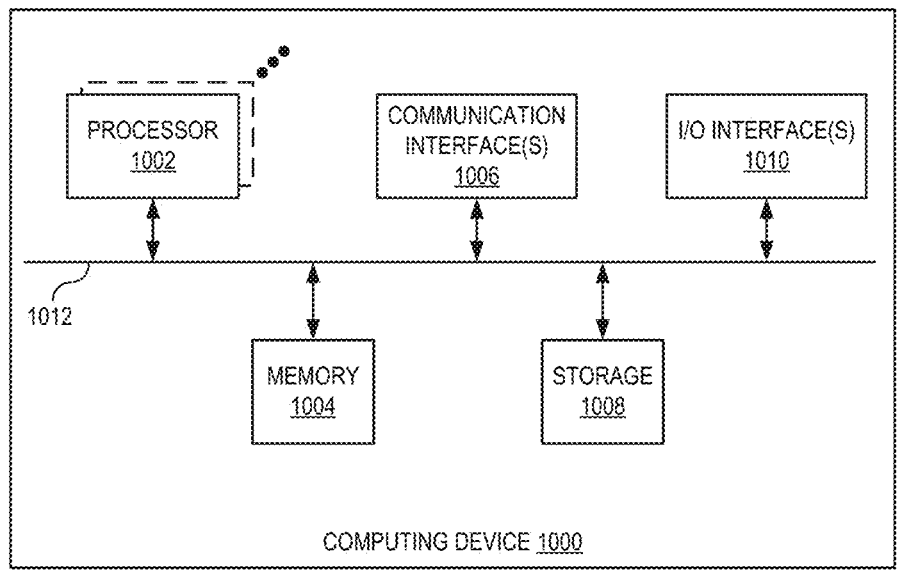
FIG. 10 illustrates a block diagram of an exemplary computing device in accordance with one or more embodiments.

FIG. 10 illustrates, in block diagram form, an exemplary computing device 1000 that may be configured to perform one or more of the processes described above. One will appreciate that one or more computing devices such as the computing device 1000 may implement the image processing system. As shown by FIG. 10, the computing device comprises a processor 1002, memory 1004, one or more communication interfaces 1006, a storage device 1008, and one or more I/O devices/interfaces 1010. In certain embodiments, the computing device 1000 includes fewer or more components than those shown in FIG. 10. Components of computing device 1000 shown in FIG. 10 will now be described in additional detail.

In particular embodiments, processor(s) 1002 includes hardware for executing instructions, such as those making up a computer program. As an example, and not by way of limitation, to execute instructions, processor(s) 1002 may retrieve (or fetch) the instructions from an internal register, an internal cache, memory 1004, or a storage device 1008 and decode and execute them. In various embodiments, the processor(s) 1002 may include one or more central processing units (CPUs), graphics processing units (GPUs), field programmable gate arrays (FPGAs), systems on chip (SoC), or other processor(s) or combinations of processors.

The computing device 1000 includes memory 1004, which is coupled to the processor(s) 1002. The memory 1004 may be used for storing data, metadata, and programs for execution by the processor(s). The memory 1004 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 1004 may be internal or distributed memory.

The computing device 1000 further include one or more communication interfaces 1006. A communication interface 1006 include hardware, software, or both. The communication interface 1006 supply one or more interfaces for communication (such as, for example, packet-based communication) between the computing device and one or more other computing devices 1000 or one or more networks. As an example, and not by way of limitation, communication interface 1006 may include a network interface controller (NIC) or network adapter for communicating with an Ethernet or other wire-based network or a wireless NIC (WNIC) or wireless adapter for communicating with a wireless network, such as a WI-FI. The computing device 1000 further include a bus 1012. The bus 1012 comprise hardware, software, or both that couples components of computing device 1000 to each other.

The computing device 1000 includes a storage device 1008 includes storage for storing data or instructions. As an example, and not by way of limitation, storage device 1008 comprise a non-transitory storage medium described above. The storage device 1008 may include a hard disk drive (HDD), flash memory, a Universal Serial Bus (USB) drive or a combination of these or other storage devices. The computing device 1000 also includes one or more input or output ("I/O") devices/interfaces 1010, which are provided to allow a user to provide input to (such as user strokes), receive output from, and otherwise transfer data to and from the computing device 1000. These I/O devices/interfaces 1010 may include a mouse, keypad or a keyboard, a touch screen, camera, optical scanner, network interface, modem, other known I/O devices or a combination of such I/O devices/interfaces 1010. The touch screen may be activated with a stylus or a finger.

The I/O devices/interfaces 1010 may include one or more devices for presenting output to a user, including, but not limited to, a graphics engine, a display (e.g., a display screen), one or more output drivers (e.g., display drivers), one or more audio speakers, and one or more audio drivers.

In certain embodiments, I/O devices/interfaces 1010 is configured to provide graphical data to a display for presentation to a user. The graphical data may be representative of one or more graphical user interfaces and/or any other graphical content that may serve a particular implementation.

In the foregoing specification, embodiments have been described with reference to specific exemplary embodiments thereof. Various embodiments are described with reference to details discussed herein, and the accompanying drawings illustrate the various embodiments. The description above and drawings are illustrative of one or more embodiments and are not to be construed as limiting. Numerous specific details are described to provide a thorough understanding of various embodiments.

Embodiments may include other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

We claim:

1. A method comprising:
    obtaining an electronic document comprising a plurality of text paragraphs;
    detecting a typographical error in a plurality of error paragraphs of the plurality of text paragraphs, wherein the typographical error is classified as one of a runt error, an orphan error, or a widow error;
    determining a priority queue of error paragraphs based on a number of added characters that remove the typographical error or a number of removed characters that remove the typographical error, wherein a highest priority of the priority queue is assigned to an error paragraph including a typographical error associated with a minimum number of characters that remove the typographical error or a minimum number of characters added to the typographical error that remove the typographical error, wherein the typographical error is removed when:
        a line including the typographical error preceding a formatting break is removed, and
        a line including the typographical error succeeding a formatting break is removed; and
    adjusting one or more attributes of the error paragraph based on the priority queue.

2. The method of claim 1 further comprising:
    indexing a set of text paragraphs, wherein each text paragraph in the set of text paragraphs includes at least one typographical error.

3. The method of claim 1, wherein adjusting one or more attributes of the error paragraph further comprises:
    adjusting one or more of a character spacing, a word spacing, or a glyph scaling.

4. The method of claim 3, wherein adjusting one or more attributes of the error paragraph further comprises:
    adjusting the character spacing, the word spacing, or the glyph scaling by a first amount;
    responsive to the adjusting by the first amount, detecting a second typographical error within the plurality of text paragraphs; and
    adjusting the character spacing, the word spacing, or the glyph scaling by a second amount in response to detecting the second typographical error.

5. The method of claim 1, wherein determining a priority queue of error paragraphs further comprises:
    determining a magnitude of each typographical error of a plurality of typographical errors in the plurality of error paragraphs based on the number of added characters or the number of removed characters associated with each error paragraph in the plurality of text paragraphs that removes the typographical error included in the error paragraph of the plurality of text paragraphs; and
    assigning a priority in the priority queue to each error paragraph based on the number of added characters or the number of removed characters.

6. The method of claim 5 further comprising:
    determining, based on the number of added characters or the number of removed characters, a candidate adjustment from a plurality of candidate adjustments that removes a typographical error of the plurality of typographical errors in the plurality of error paragraphs;
    computing a difference between an updated electronic document in which the candidate adjustment is applied and the electronic document; and
    selecting the candidate adjustment based on the difference corresponding to each candidate adjustment of the plurality of candidate adjustments.

7. The method of claim 1, wherein the electronic document further comprises embedded content including an image or a graphic.

8. A non-transitory computer-readable storage medium including instructions stored thereon which, when executed by at least one processor, cause the at least one processor to:
    obtain an electronic document comprising a plurality of text paragraphs;
    detect a typographical error in a plurality of error paragraphs of the plurality of text paragraphs, wherein the typographical error is classified as one of a runt error, an orphan error, or a widow error;
    determine a priority queue of error paragraphs based on a number of added characters that remove the typographical error or a number of removed characters that remove the typographical error, wherein a highest priority of the priority queue is assigned to an error paragraph including a typographical error associated with a minimum number of characters that remove the typographical error or a minimum number of characters added to the typographical error that remove the typographical error, wherein the typographical error is removed when:
        a line including the typographical error preceding a formatting break is removed, and
        a line including the typographical error succeeding a formatting break is removed; and
    adjust one or more attributes of the error paragraph based on the priority queue.

9. The non-transitory computer-readable storage medium of claim 8, the at least one processor further caused to index each text paragraph in the plurality of text paragraphs, wherein each text paragraph in the plurality of text paragraphs includes at least one typographical error.

10. The non-transitory computer-readable storage medium of claim 9, wherein to adjust one or more attributes of the error paragraph, the at least one processor is further caused to adjust one or more of a character spacing, a word spacing, or a glyph scaling.

11. The non-transitory computer-readable storage medium of claim 10, wherein to adjust one or more attributes of the error paragraph, the at least one processor is further caused to:
adjust the character spacing, the word spacing, or the glyph scaling by a first amount;
responsive to adjusting by the first amount, detect a second typographical error within the plurality of text paragraphs; and
adjust the character spacing, the word spacing, or the glyph scaling by a second amount in response to detecting the second typographical error.

12. The non-transitory computer-readable storage medium of claim 8, wherein to determine the priority queue of error paragraphs the at least one processor is further caused to:
determine a magnitude of each typographical error of a plurality of typographical errors in the plurality of error paragraphs based on the number of added characters or the number of removed characters associated with each error paragraph in the plurality of text paragraphs that removes the typographical error included in the error paragraph of the plurality of text paragraphs; and
assign a priority in the priority queue to each error paragraph based on the number of added characters or the number of removed characters.

13. The non-transitory computer-readable storage medium of claim 12, the at least one processor further caused to:
determine, based on the number of added characters or the number of removed characters, a candidate adjustment from a plurality of candidate adjustments that removes a typographical error of the plurality of typographical errors in the plurality of error paragraphs;
compute a difference between an updated electronic document in which the candidate adjustment is applied and the electronic document; and
select the candidate adjustment based on the difference corresponding to each candidate adjustment of the plurality of candidate adjustments.

14. The non-transitory computer-readable storage medium of claim 8, wherein the electronic document further comprises embedded content including an image or a graphic.

15. A system comprising:
a memory; and
a processing device coupled to the memory, the processing device is caused to:
detect a typographical error in a plurality of error paragraphs of a plurality of text paragraphs, wherein the typographical error is a runt error, an orphan error, or a widow error;
determine a priority queue of error paragraphs based on a number of added characters that remove the typographical error or a number of removed characters that remove the typographical error, wherein a highest priority of the priority queue is assigned to an error paragraph including a typographical error associated with a minimum number of characters that remove the typographical error or a minimum number of characters added to the typographical error that remove the typographical error;
classify the typographical error as the runt error, the orphan error, or the widow error based on whether the typographical error is preceding a formatting break or succeeding the formatting break; and
adjust one or more typesetting attributes in the error paragraph based on the priority queue, wherein the adjusted one or more typesetting attributes remove a line including the typographical error preceding the formatting break or remove the line including the typographical error succeeding the formatting break.

16. The system of claim 15, wherein to detect a typographical error in a plurality of error paragraphs of a plurality of text paragraphs, the processing device is further caused to identify a number of characters that are included in the typographical error of each error paragraph of the plurality of error paragraphs and to determine a position of the typographical error within each error paragraph of the plurality of error paragraphs.

17. The system of claim 16, wherein to adjust one or more typesetting attributes of the error paragraph, the processing device is further caused to adjust one or more of a character spacing, a word spacing, or a glyph scaling.

18. The system of claim 17, wherein to adjust one or more typesetting attributes of the error paragraph, the processing device is further caused to:
adjust the character spacing, the word spacing, or the glyph scaling by a first amount;
responsive to adjusting by the first amount, detect a second typographical error within the plurality of text paragraphs; and
adjust the character spacing, the word spacing, or the glyph scaling by a second amount in response to detecting the second typographical error.

19. The system of claim 16, wherein to classify the typographical error, the processing device is further caused to:
determine a magnitude of the typographical error based on the number of characters added to the line or the number of characters removed from the line;
determine a position of the typographical error as a first line of a paragraph or a last line of a paragraph; and
compute a closest formatting break associated with the position of the typographical error and the number of characters to add to the line or the number of characters to remove from the line, wherein a formatting break is one of a page break, column break, section break, or change of indentation.

20. The system of claim 19, the processing device further caused to:
classify the typographical error as a runt when the number of characters is 10 or less and the position of the typographical error is the last line of a paragraph and precedes the formatting break;
classify the typographical error as a widow when the number of characters is greater than 10 and the position of the typographical error is the first line of a paragraph and precedes the formatting break; or classify the typographical error as an orphan when the number of characters is greater than 10 and the position of the typographical error is the last line of a paragraph and succeeds the formatting break.

* * * * *